(12) United States Patent
Mendenhall et al.

(10) Patent No.: US 8,060,150 B2
(45) Date of Patent: Nov. 15, 2011

(54) INTRA-VEHICULAR MOBILE DEVICE USAGE DETECTION SYSTEM AND METHOD OF USING THE SAME

(75) Inventors: Robert L. Mendenhall, Las Vegas, NV (US); R. Jason Mendenhall, Las Vegas, NV (US); Gregory D. Miller, Las Vegas, NV (US); Gunter Karg, Las Vegas, NV (US)

(73) Assignee: Robert L. Mendenhall, Las Vegas, NV (US)

( * ) Notice: Subject to any disclaimer, the term of this patent is extended or adjusted under 35 U.S.C. 154(b) by 0 days.

(21) Appl. No.: 12/749,121

(22) Filed: Mar. 29, 2010

(65) Prior Publication Data

US 2011/0237219 A1    Sep. 29, 2011

(51) Int. Cl.
*H04M 1/00* (2006.01)
(52) U.S. Cl. ............... 455/569.2; 455/575.9; 455/575.7
(58) Field of Classification Search .................. 455/405, 455/406, 407, 408, 409, 569.1, 569.2, 575.6, 455/575.7, 575.9, 562.1; 342/463, 456; 379/114.01, 379/114.19, 88, 105; 340/576, 426.2, 995.13, 340/905, 937, 933, 936; 296/65.07, 65.01
See application file for complete search history.

(56) References Cited

U.S. PATENT DOCUMENTS

| | | | |
|---|---|---|---|
| 5,233,642 A | 8/1993 | Renton | |
| 5,673,306 A | 9/1997 | Amadon et al. | |
| 5,684,861 A | 11/1997 | Lewis et al. | |
| 6,225,897 B1 | 5/2001 | Doyle et al. | |
| 7,292,152 B2 | 11/2007 | Torkkola et al. | |
| 7,565,230 B2 | 7/2009 | Gardner et al. | |
| 7,646,312 B2 * | 1/2010 | Rosen | 340/937 |
| 7,934,763 B2 * | 5/2011 | Mabuchi et al. | 296/65.07 |
| 7,957,773 B2 * | 6/2011 | Chua et al. | 455/569.2 |
| 2006/0284769 A1 * | 12/2006 | Bolduc et al. | 342/463 |
| 2007/0293206 A1 | 12/2007 | Lund | |
| 2008/0036623 A1 * | 2/2008 | Rosen | 340/936 |
| 2008/0154438 A1 | 6/2008 | Kalik | |
| 2008/0242315 A1 | 10/2008 | Ferman | |
| 2009/0085728 A1 | 4/2009 | Catten et al. | |

\* cited by examiner

*Primary Examiner* — Jean Gelin
(74) *Attorney, Agent, or Firm* — Greenberg Traurig

(57) ABSTRACT

A system and method for detecting and storing mobile device usage by a driver of a vehicle. An antenna in a vehicle is configured and positioned to detect mobile device signals from the driver area in the vehicle. A processor in communication with the antenna analyzes the detected signals for frequency and strength. The antenna and processor may communicate with vehicle data collection systems (e.g., GPS, telemetry, etc.) such that the mobile device usage data may be collected along with the vehicle operation data. The mobile device usage data and vehicle operational data can be evaluated to determine the impact of mobile device usage by the driver of a vehicle. The data may be especially useful to the trucking, train, bus, and mass transit industries in order to educate drivers about the dangers associated with using mobile devices while driving.

26 Claims, 17 Drawing Sheets

| Ref | Desc | Value | Tolorance | Package | Type | MFG | Part No. |
|---|---|---|---|---|---|---|---|
| | 1 PWB | | | | | | |
| C101 | CAP | 100 nF | 20% | 805 | | | |
| C102 | CAP | 220 nF | 20% | 805 | | | |
| C103 | CAP | 100 nF | 20% | 805 | | | |
| C104 | CAP | 100 nF | 20% | 805 | | | |
| C105 | CAP | 33 pF | 5% | 805 | NPO | | |
| C106 | CAP | 33 pF | 5% | 805 | NPO | | |
| C201 | CAP | 100 nF | 20% | 805 | | | |
| C202 | CAP | 100 nF | 20% | 805 | | | |
| C203 | CAP | 1 nF | 10% | 805 | | | |
| C204 | CAP | 100 nF | 20% | 805 | | | |
| C205 | CAP | 100 nF | 20% | 805 | | | |
| C206 | CAP | 100 nF | 20% | 805 | | | |
| C207 | CAP | 100 nF | 20% | 805 | | | |
| C208 | CAP | 10 pF | 5% | 805 | NPO | | |
| C209 | CAP | 100 nF | 20% | 805 | | | |
| C210 | CAP | 100 nF | 20% | 805 | | | |
| C211 | CAP | 10 pF | 5% | 805 | NPO | | |
| C212 | CAP | 100 nF | 20% | 805 | | | |
| C213 | CAP | 10 pF | 5% | 805 | NPO | | |
| C214 | CAP | 100 pF | 5% | 805 | NPO | | |
| C215 | CAP | 1 nF | 10% | 805 | | | |
| C216 | CAP | 33 nF | 10% | 805 | | | |
| C217 | CAP | 47 nF | 10% | 805 | | | |
| C218 | CAP | 1 nF | 10% | 805 | | | |
| C219 | CAP | OPEN | | 805 | | | |
| C220 | CAP | 100 pF | 5% | 805 | NPO | | |
| C221 | CAP | 100 pF | 5% | 805 | NPO | | |
| C222 | CAP | 470 pF | 5% | 805 | NPO | | |
| C223 | CAP | 100 pF | 5% | 805 | NPO | | |
| C225 | CAP | 100 nF | 20% | 805 | | | |
| C226 | CAP | 1 uF | 10% | 805 | X7R | AVX Corp | 0805ZC105KAT2A |
| C227 | CAP | 1 uF | 10% | 805 | X7R | AVX Corp | 0805ZC105KAT2A |
| C228 | CAP | 1 uF | 10% | 805 | X7R | AVX Corp | 0805ZC105KAT2A |
| C229 | CAP | 1 uF | 10% | 805 | X7R | AVX Corp | 0805ZC105KAT2A |
| C230 | CAP | 4.7 nF | 10% | 805 | | | |
| C231 | CAP | 4.7 nF | 10% | 805 | | | |
| C232 | CAP | 4.7 nF | 10% | 805 | | | |
| C233 | CAP | 330 nF | -4 | 805 | Y5V | | |
| C234 | CAP | 1 uF | 10% | 805 | X7R | AVX Corp | 0805ZC105KAT2A |
| C235 | CAP | 1 uF | 10% | 805 | X7R | AVX Corp | 0805ZC105KAT2A |
| L201 | IND | 15 uH | 5% | 1008 | | Panasonic | ELJ-FC150JF |
| D101 | LED | RED | | | | | |
| D102 | DIODE | | | 1210 | Varistor | Littelfuse | V30 MLA1210H |
| D103 | DIODE | 1A | | MINI2-F1 | Schottky | Panasonic | MA2YD15 |
| D201 | DIODE | 1A | | MINI2-F1 | Schotky | Panasonic | MA2YD15 |
| J101 | Jack | 5 pin | | Mini-CT | | Tyco | 292227-5 |
| J102 | Jack | 4 pin | | Mini-CT | | Tyco | 292227-4 |
| Q101 | Transistor | Dual N-MOSFET | MicroFET 2x2 | N-Channel | | Fairchild | FDMA1028NZ |
| Q201 | Transistor | JFET | | M04 | N-Channel | CEL | NE3508M04 |
| R101 | RES | 22K, 1/8W | 5% | 805 | Carbon Film | | |
| R102 | RES | 22K, 1/8W | 5% | 805 | Carbon Film | | |
| R103 | RES | 150, 1/8W | 5% | 805 | Carbon Film | | |
| R104 | RES | 220, 1/8W | 5% | 805 | Carbon Film | | |
| R105 | RES | 0 (Jumper) | | 805 | | | |
| R201 | RES | 4.7K, 1/8W | 5% | 805 | Carbon Film | | |
| R202 | RES | 1K, 1/8W | 5% | 805 | Carbon Film | | |
| R203 | RES | 150, 1/8W | 5% | 805 | Carbon Film | | |
| R204 | RES | 18, 1/8W | 5% | 805 | Carbon Film | | |
| R205 | RES | 100, 1/8W | 5% | 805 | Carbon Film | | |
| R206 | RES | 330, 1/8W | 5% | 805 | Carbon Film | | |
| R207 | RES | 0 (Jumper) | | 805 | | | |
| R208 | RES | 49, 1/8W | 1% | 805 | Carbon Film | | |
| R209 | RES | 10k, 1/8W | 5% | 805 | Carbon Film | | |
| R210 | RES | 1K, 1/8W | 5% | 805 | Carbon Film | | |
| R211 | RES | 510, 1/8W | 5% | 805 | Carbon Film | | |
| U101 | IC | Regulator 3.3V | SOT-223 | | Texas Inst. | | uA78M33CDCY |
| U102 | IC | Microprocessor | 2BQFN | | Microchip | | PIC18LF1220-I/ML |
| U201 | IC | Wideband synthesizer | 32LFCSP | | Analog Dev. | | ADF4350BCPZ |
| U202 | IC | Frequency Mixer | CD542 | | MiniCircuits | | ADE-30 |
| U203 | IC | LowVoltage IF | 20SSOP | | Philips | | SA676DK |
| Y101 | Crystal | 10MHz | 30 ppm | 11.4x4.8mm | Par /20 pF | ECS | ECS-100-20-30B-DU |

INTRA-VEHICULAR MOBILE DEVICE USAGE DETECTION SYSTEM AND METHOD OF USING THE SAME

FIELD OF THE INVENTION

The embodiments of the present invention relate to a system and method for detecting and storing mobile device (e.g., cellular telephone) usage and corresponding vehicle data such that a data profile of usage may be created and addressed with the driver.

BACKGROUND

It is established that the use of a mobile device while driving a motor vehicle increases the chances of an accident. A University of Utah study finds that there is a four-fold increase in the risk of an accident when operating a cell phone. Accordingly, many states (e.g., California) have banned the use of mobile devices, including cellular telephones, while operating motor vehicles unless the driver uses a hands-free device. The study also finds that the use of a hands-free device does not eliminate the increased risk of an accident related to inattentiveness caused by the use of the mobile device.

There have been many systems proposed for disabling and or otherwise rendering mobile devices unworkable, except for emergency situations, while the owner is operating a motor vehicle. For example, certain systems are triggered by the ignition of the motor vehicle such that the cell phone is disabled responsive to the motor vehicle being started. The embodiments of the present invention are not directed to actively disabling the use of mobile devices by operators of motor vehicles but are rather directed to analyzing data profiles of mobile device usage and using the data to develop protocols for encouraging drivers to change their bad habits and voluntarily cease using mobile devices while operating motor vehicles.

Thus, there is a need for a system and method that allows intra-vehicular mobile device usage to be detected and stored such that a data profile can be generated. Advantageously, the system and method should be able to differentiate intra-vehicular mobile device usage of the driver from non-drivers and from mobile device usage external to the vehicle.

SUMMARY

Accordingly, the embodiments of the present invention are directed to a system and method for detecting and storing intra-vehicular mobile device usage. By correlating the mobile device usage data with corresponding vehicle operational data, a data profile related to the usage can be created. The data profile is then used to create protocols for encouraging drivers to stop the practice of utilizing mobile devices while operating motor vehicles. In one embodiment, a system detects and stores intra-vehicular mobile device usage within a fleet of vehicles (e.g., trucking enterprise) and captures vehicle operational data such that a data profile can be used to educate drivers and provide incentives to stop them from using mobile devices while operating the trucks. The data may also be provided to insurance companies to support lower negotiated rates.

In one embodiment, a telemetry system is used to receive time, location and speed data acquired during the detection of a driver's intra-vehicular usage of a mobile device. The data is used by pattern-matching algorithms to allow users to formulate a protocol for training drivers. In another embodiment, a GPS system is used to acquire vehicle movement and location data.

The embodiments of the present invention utilize characteristics of radio frequency transmission, propagation, detection, cell phone uplink standards and statistical methods to mitigate false positive and false negative output signals.

The embodiments of the present invention may be used to detect and store mobile device usage by drivers vehicles including cars, buses, trains, trucks and other vehicles and acquire any vehicle operational data desired.

Other variations, embodiments and features of the present invention will become evident from the following detailed description, drawings and claims.

BRIEF DESCRIPTION OF THE DRAWINGS

FIG. 3c illustrates an exemplary list of electronics used to configure the circuit board according to the schematics of FIGS. 3a and 3b;

DETAILED DESCRIPTION

Figure 1:
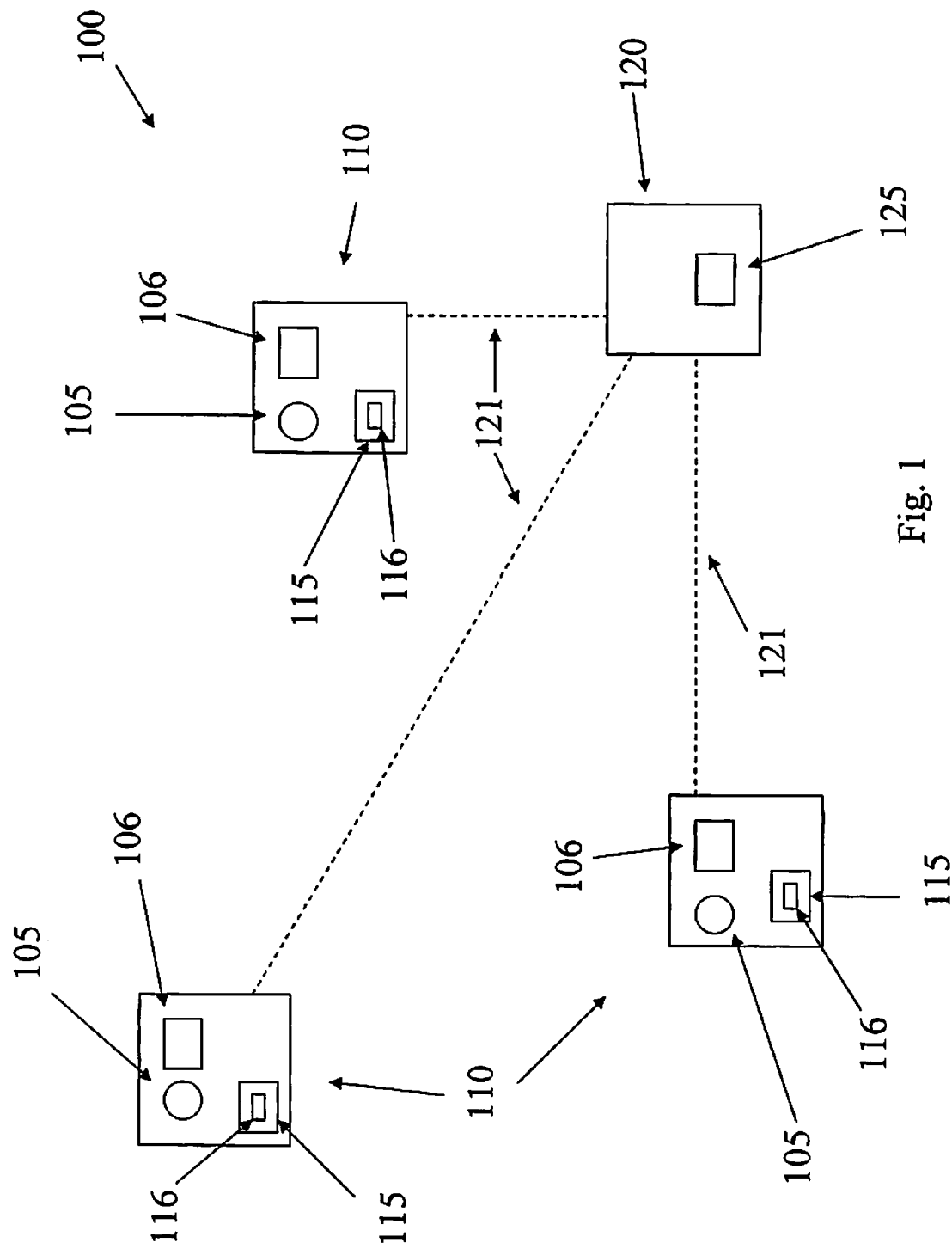
FIG. 1 illustrates a block diagram of a system according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention are directed to a system and method of detecting and storing mobile device (e.g., cellular telephone) usage by a driver of a vehicle. To fully evaluate the mobile device usage data, vehicle data is acquired by GPS, telemetry or other system and correlated with the mobile device usage data allowing operators to evaluate the impact of mobile device usage on driving quality. Drivers may be educated and trained with the acquired mobile device usage and vehicle data. The system and method are very useful to operators of vehicle fleets including trucks, cars, trains and the like. Insurance companies may also deem the acquired data beneficial. The system and method may be used independent of vehicle data collection systems and correlated separately to build a useful data profile. In other words, the mobile device usage data is more meaningful when correlated with the vehicle operational data. For example, the use of a mobile device is not problematic if the vehicle is parked or otherwise not moving. Also, there may be circumstances, such as emergencies, when mobile device usage in a moving vehicle is acceptable to an operator. Therefore, the correlation of mobile device usage data and vehicle operational data provides the most benefit to the operator.

Mobile telephones are essentially radios which rely on a radio signal in order to transmit and receive voice and data information. Mobile telephones include small radios with mini transmitters which transmit radio signals when the cellular telephone is powered on. One crucial part of the mobile phone communication system is relay centers called base stations. The base station serves as the electronic bridge between two mobile telephones wherein mobile telephone transmits a certain amount of radio signal, whatever base station nearest to the mobile telephone captures its presence. Therefore, mobile telephones are always online ready to receive calls and texts. When one mobile telephone user wants to contact another mobile telephone user, the mobile telephone transmits a signal to the nearest base station. This base station then transmits to a series of telecom relay devices such as channel towers or satellites until the signal reaches a local base station. When a particular number is dialed, the base station automatically identifies that phone number and assigns an encrypted code to the transmission.

FIG. 1 shows a block diagram 100 of a system according to one embodiment of the present invention. The system 100 includes one or more directional antennas 105, in communication with a microprocessor on a printed circuit board 106 forming mobile device usage detectors, installed in a plurality of vehicles 110 (e.g., a fleet of commonly owned trucks), telemetry equipment 115 installed in said plurality of vehicles 110 and a remote telemetry unit (i.e., base station) 120 including, or linked to, a central processing unit 125 configured to receive and analyze data transmitted by said telemetry equipment 115 within said plurality of vehicles 110. As shown, the telemetry equipment 115 communicates with a telemetry unit via a wireless link 121 but data from the telemetry equipment may also be downloaded using a wired connection. The collected data may also be stored in a memory device irrespective of the telemetry equipment 115. Collected data may be transmitted directly to a central processing unit 125 via a GPS system or other wireless system capable of transmitting data wirelessly.

In one embodiment, the telemetry equipment 115 (of the type sold by Zonar Systems headquartered in Seattle, Wash.) includes an onboard computer 116 which is configured to monitor the diagnostics (e.g., speed, RPMs, etc.) of the vehicle over time. Sensors, such as transducers, are connected to critical vehicle components. The sensors transmit information to the onboard computer 116 wirelessly or via wired connections. The data is stored in a memory device associated with the onboard computer 116. The data is then transmitted to the base station telemetry unit 120 where it can be analyzed by the central processing unit and/or personnel. The data may also be analyzed locally via the onboard computer 116. The data may be wirelessly transmitted or downloaded directly from the telemetry equipment 115. Such telemetry systems, or similar systems, are known in the art such that specific details need not be disclosed herein. As set forth above, the telemetry system and signal detecting and analyzing system according to the embodiments of the present invention may or may not be integrated as a single system. Indeed, the system according to the embodiments of the present invention do not require the telemetry system at all but may rely on a GPS system or other type of vehicle data collection system. For example, a GPS system may acquire movement and location data associated with a vehicle.

Figure 2A:
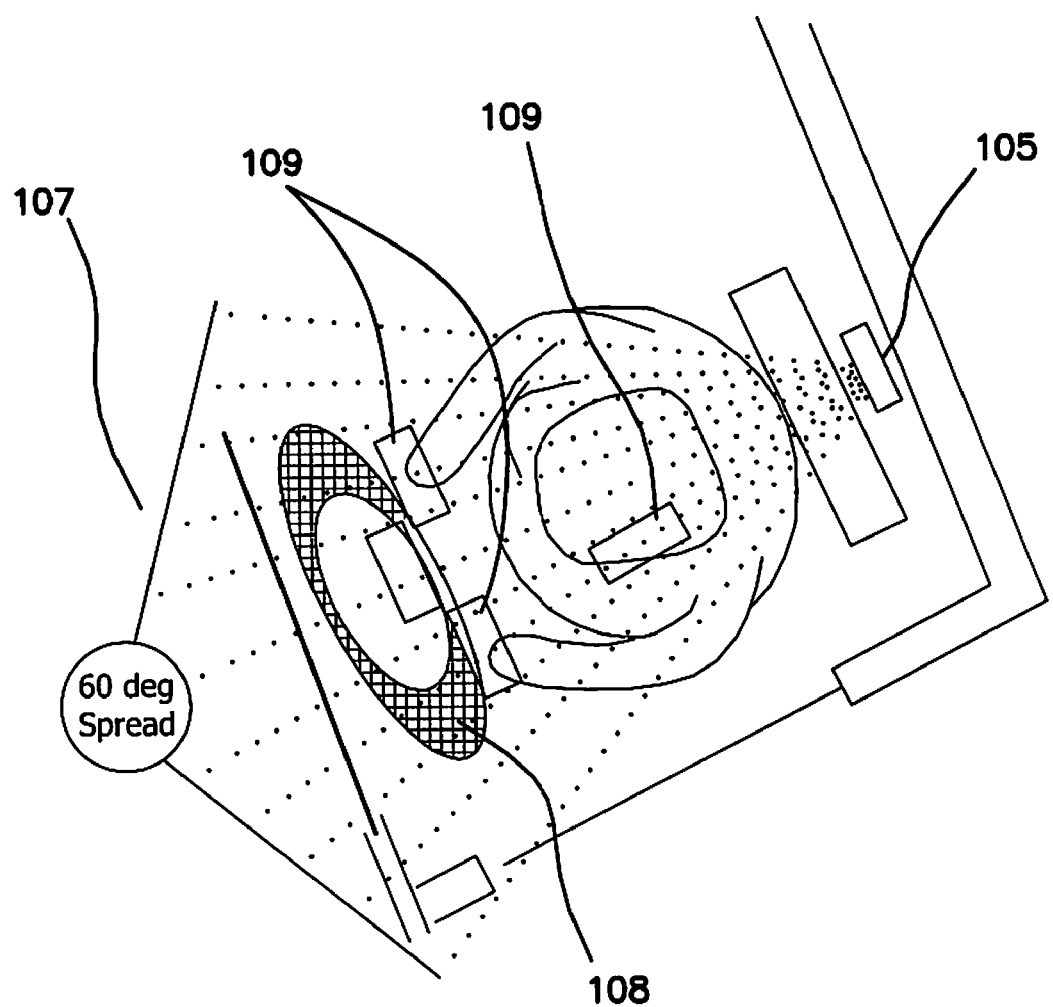
FIGS. 2a and 2b illustrate an exemplary position of mobile device usage detectors within a vehicle according to the embodiments of the present invention.
Figure 2B:
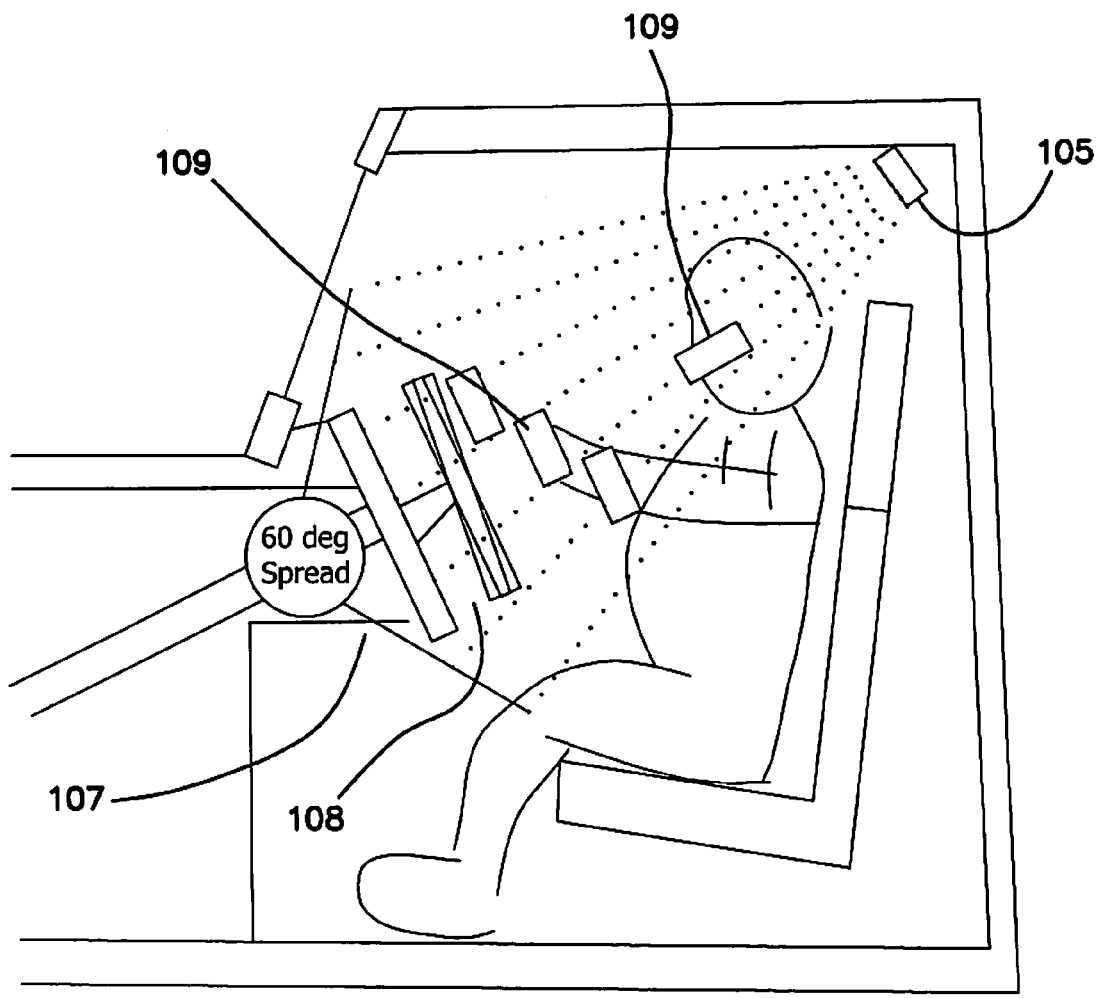

The directional antennas 105 are positioned within a cab of the vehicle. FIGS. 2a and 2b show top and side views of a directional antenna 105 positioned behind a driver. The directional antennas 105 are configured and positioned to detect cell phone usage (calls and texts) within the driver area. That is, the position of the one or more directional antennas is based on the desire to capture driver mobile device usage and eliminate mobile device usage by passengers or persons external to the subject vehicle. In one embodiment, the directional antennas 105 are configured to detect mobile device usage in a conical spectrum 107. As shown, the conical spectrum provides 60 degrees of detection space near the steering wheel 108 of the vehicle. In one embodiment, a directional antenna 105 is positioned behind and above the driver and directed downward to capture mobile device usage in the driver area. Therefore, the coverage zone of the directional antenna 105 captures usage of a mobile device 109 near the driver's ear and the steering wheel 108. The directional antenna 105 may also be positioned forward, below or above the driver area. In one embodiment, the directional antenna 105 is a patch/microstrip antenna but those skilled in the art will recognize that other antennas, such as loop antenna, high gain, omni-directional, dipole, parabolic antennas, and others may be used as well. The patch/microstrip antenna is directional and thin allowing it to be positioned in the headliner or other cab locations. In one embodiment, the one or more antennas 105 are positioned between forty-eight and sixty inches of the driver. While not shown, the antenna 105 and/or circuit boards 106 may be contained in a housing to prevent damage. Communication between the circuit boards 106 and any onboard telemetry and/or GPS equipment 115 may be via wireless or wired connections. In systems without telemetry equipment 115, signal detection data is stored in a local or remote memory device associated with the one or more antennas 105.

In another embodiment, an external/remote antenna is linked to the circuit board 106 in a wired or wireless configuration such that the circuit board 106 and external/remote antenna may be spaced within the vehicle. For example, the circuit board 106 may be positioned in a glove box while the antenna 105 is positioned above and behind the driver or other location spaced from the circuit board 106. Such a configuration is ideal for vehicles with limited cab space, especially the limited space proximate to the driver area. The one or more antennas 105 may be joined to the circuit board 106 and may also be contained within a housing as a single unit as described above.

The directional antenna 105 detects radio frequency signals in the Code Division Multiple Access (CDMA) which operates in the 800/1900 MHz range and/or Groupe Special Mobile (GSM) which operates in the 850/1900 MHz range. Most cellular telephones utilize CDMA or GSM technology. Those skilled in the art will recognize that the antennas may also be configured to detect other signals, including Bluetooth, satellite, PCS and push-to-talk signals as well as data transmission signals.

Once detected, the signals are analyzed by a microprocessor attached to the circuit board 106. In one embodiment, the microprocessor is a PIC18LF1220-UML manufactured by Microchip headquartered in Chandler, Ariz. Those skilled in the art will recognize that other microprocessors may be used as well and that the signal analysis may take place remote from the vehicle. One objective of the microprocessor is to analyze the strength of the detected RF signal to eliminate the detection of non-driver signals (i.e., passenger) from within the vehicle. Another objective is to detect signals within a frequency range to eliminate non-mobile device bandwidth signals. Another objective is to dynamically revise a frequency list to capture all relevant signals. Another objective is to validate captured frequency data to ensure the captured signals are actually attributable to mobile device usage by a driver.

Figure 3A:
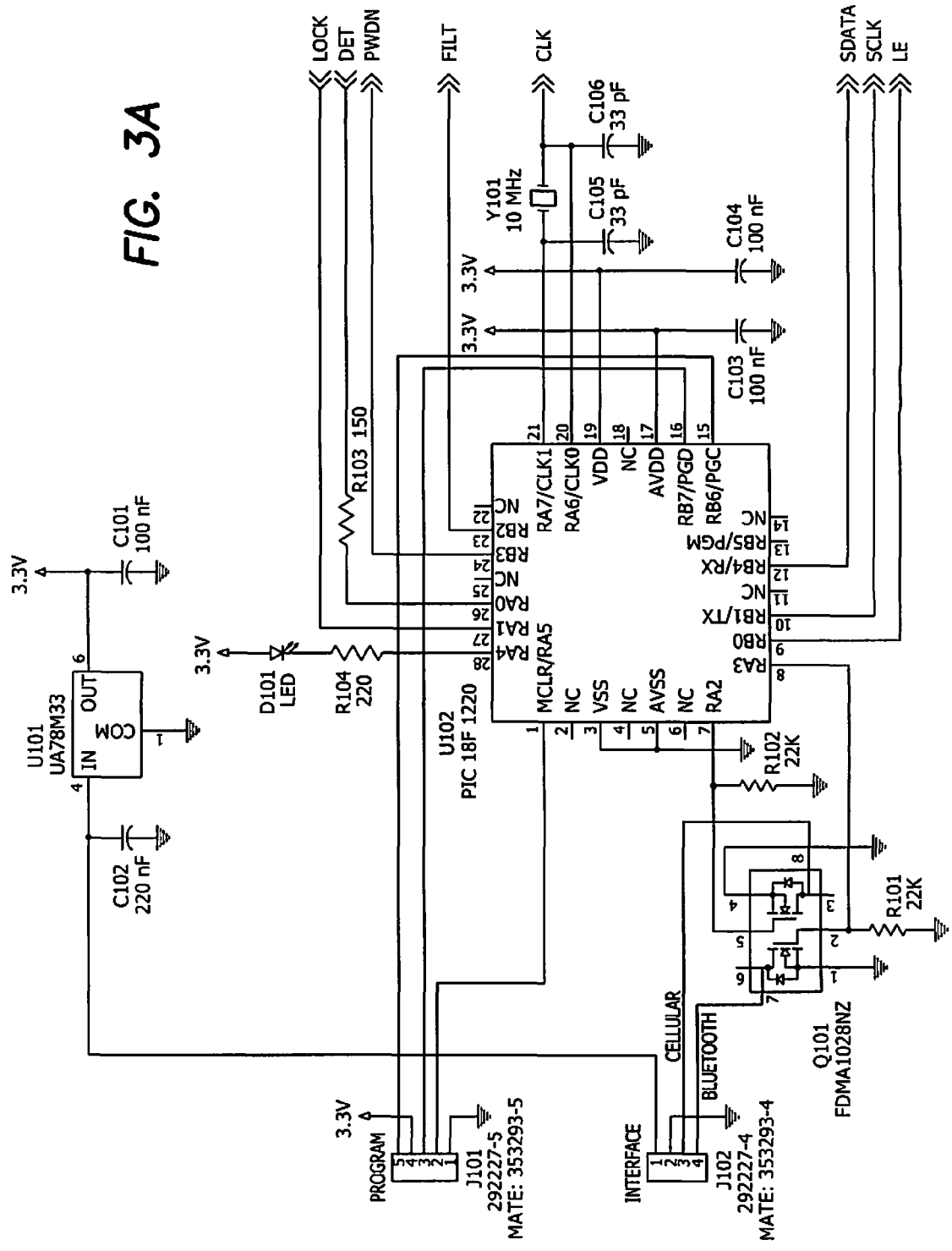
FIGS. 3a and 3b illustrate circuit board schematics for an exemplary mobile device usage detector according to the embodiments of the present invention.
Figure 3B:
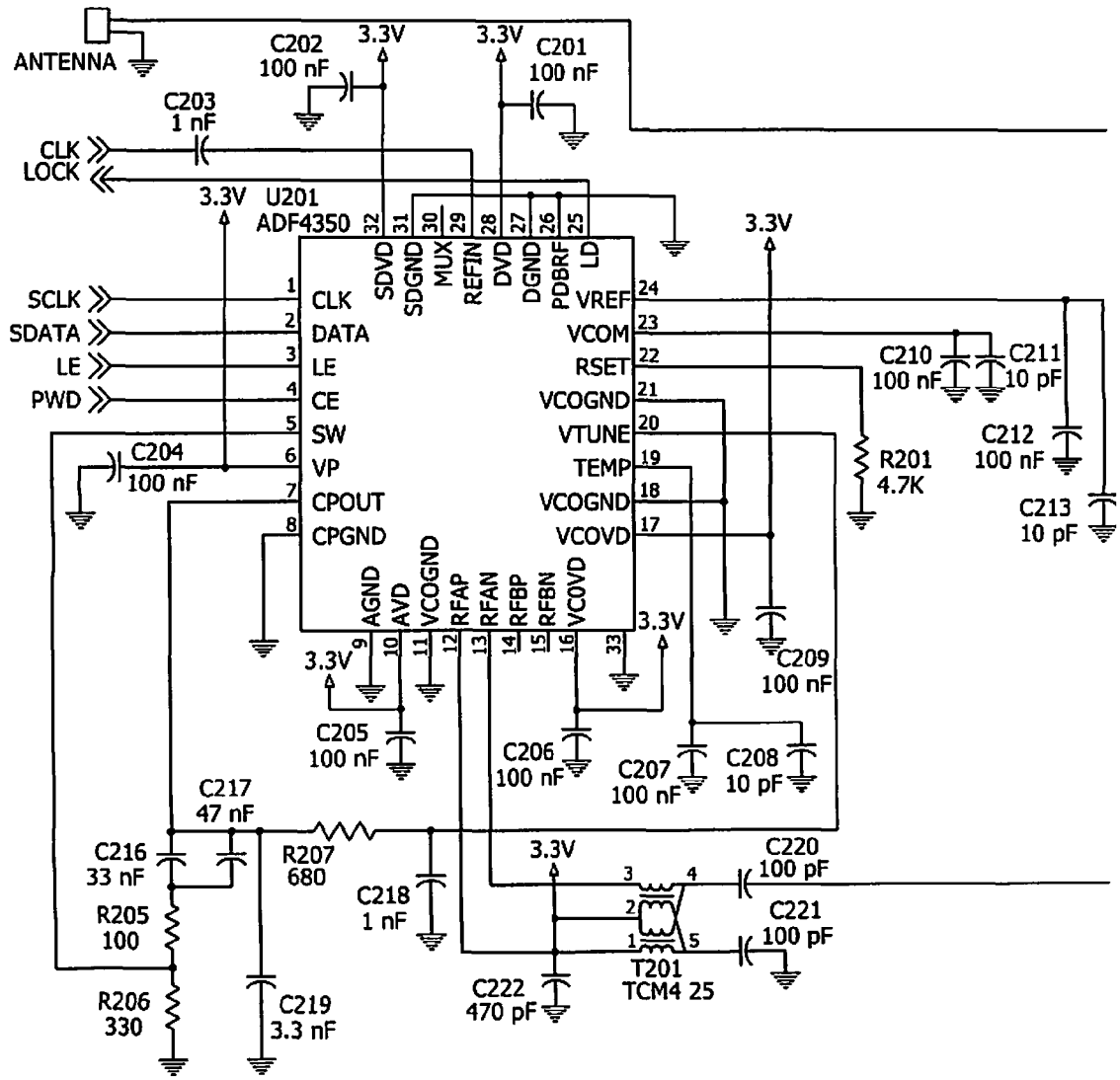
Figure 3B:
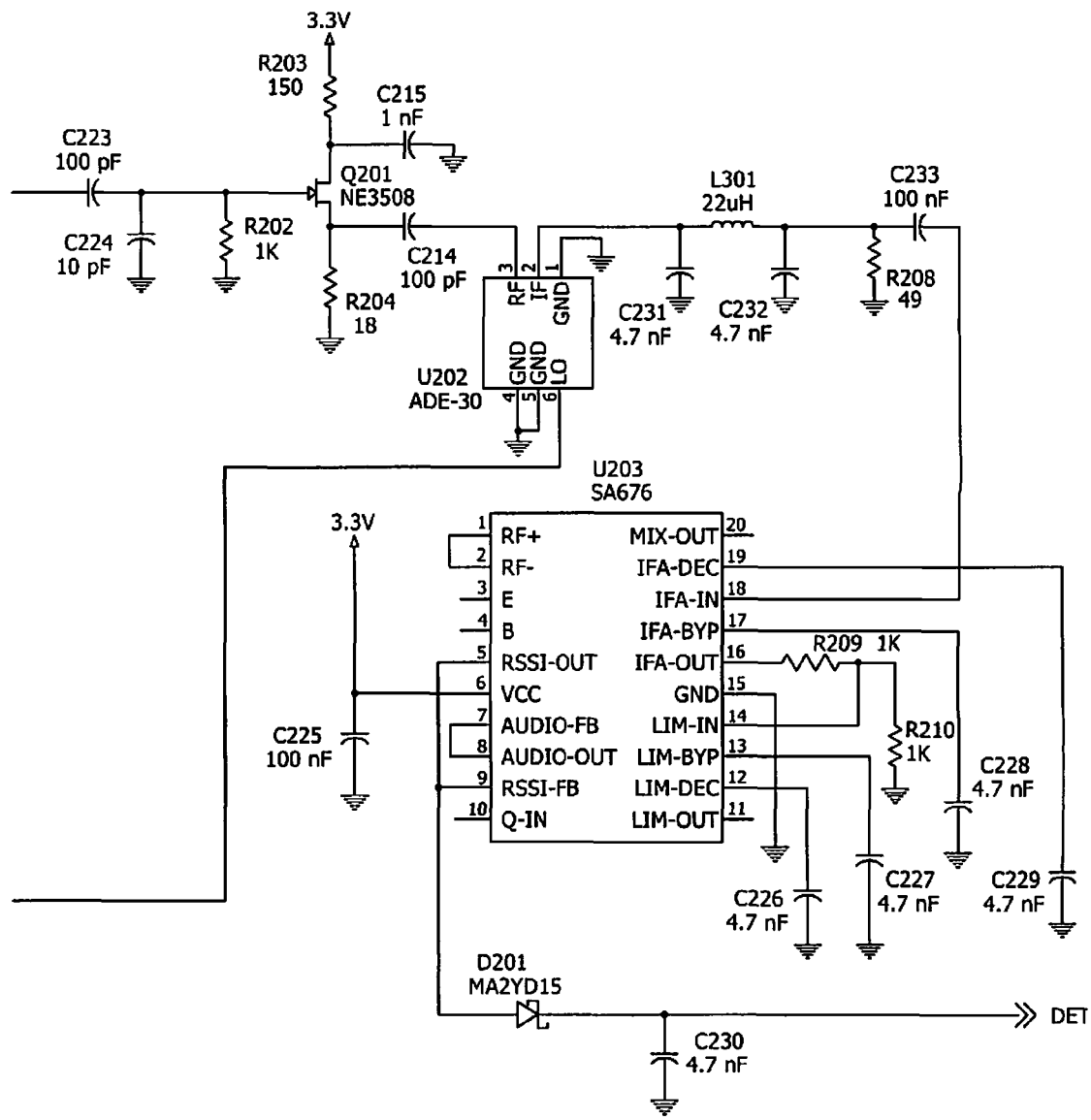

FIGS. 3a and 3b show exemplary schematic diagrams 200, 205 associated with the circuit board 106. Those skilled in the art will understand that any number of circuit board configurations are conceivable within the spirit and scope of the present invention. FIG. 3c shows a list of electronics 210 present on the circuit board 106 as identified in the schematic diagrams 200, 205 depicted in FIGS. 3a and 3b. In one embodiment, a switching regulator on the circuit board is switched off while the rest of the circuit board 106 is working thus eliminating cross-talk among the various elements of the circuit board 106. The switching regulator only runs between measurements and is otherwise turned off. Such an arrangement provides sensitivity without cross-talk from the power supply.

FIGS. 4a-4h show flow charts detailing a system operation according to the embodiments of the present invention.

Prior to installation the system is pre-programmed or loaded with known mobile device frequencies. For example, cellular telephones in the United States typically operate in the GSM-850 (824-849 MHz uplink and 869-894 MHz downlink) and GSM-1900 (1850-1910 MHz uplink and 1930-1990 MHz downlink) bands. Many other bands and frequencies and used throughout the world and may be loaded into, and detected by, the system described herein.

Figure 4A:
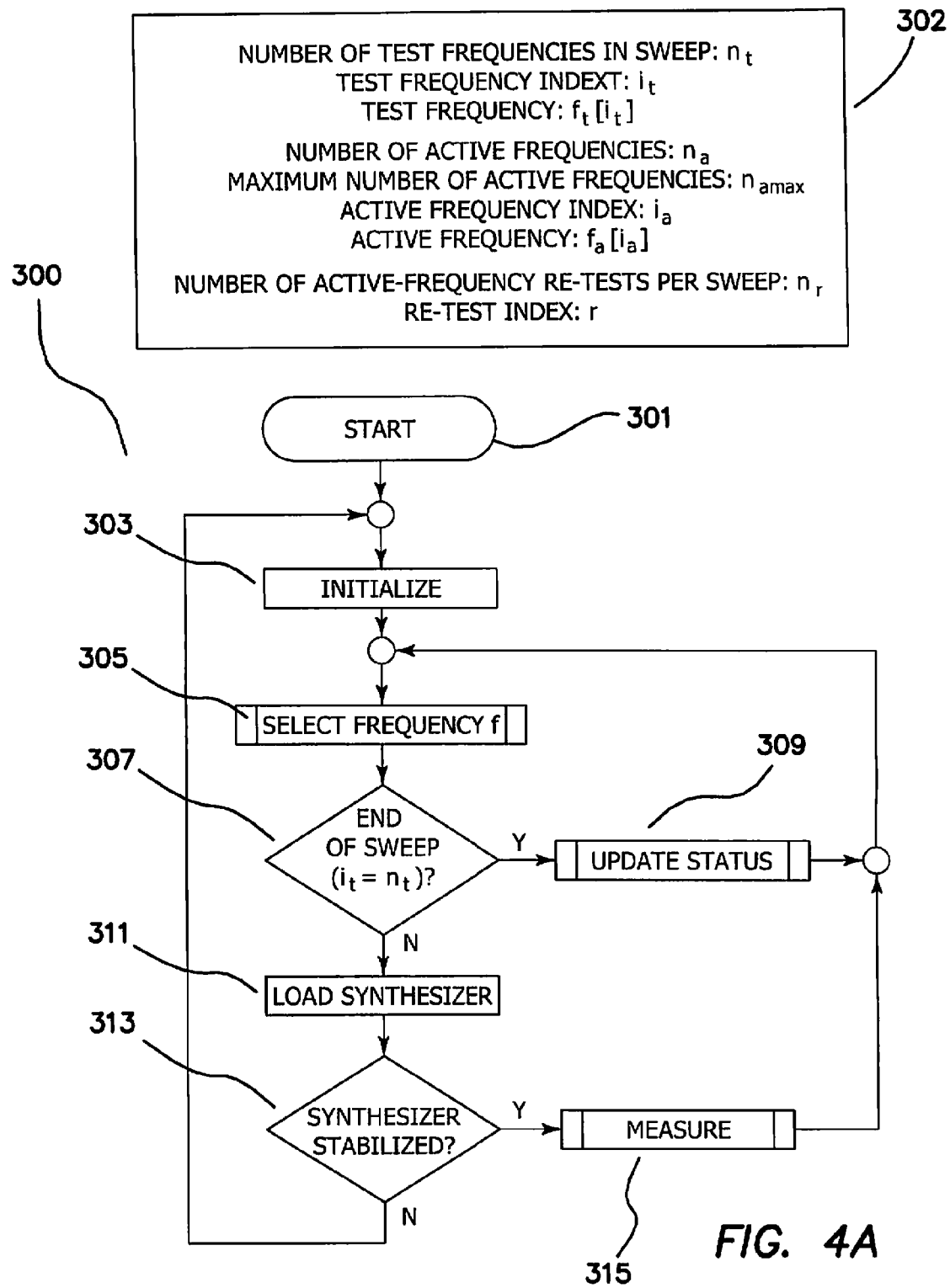
FIGS. 4a-4h illustrate flow charts which detail operations of a system according to the embodiments of the present invention.

Flow chart 300 and legend 302, shown in FIG. 4a, details an overall approach to the method of the system according to the embodiments of the present invention and begins with a start process 301 responsive to the system being turned on. At 303, the system initializes memory for indexes, variables, constants, and lists in a conventional manner. The variable (f) represents the frequency at which mobile device activity is being assessed. (Note that this is not necessarily the frequency at which the cell phone is operating. The objective of this algorithm is to assess whether a cellular telephone is operating and does this by looking through an appropriate set of frequencies used to determine the transmission protocol and thus the fact that a cellular telephone is in use.) The constant $(n_t)$ is the number of test frequencies, chosen from known ranges of mobile device frequencies, at which mobile device activity is to be tested, and in one embodiment has a value of 85. The index $(i_t)$ indicates which of the number of test frequencies $(n_t)$ is chosen for testing. The list of test frequencies $f_t[i_t]$ contains the values of the test frequencies at which mobile device activity is to be tested, and can preferably be implemented as a function $f_t[i_t]$ to reduce memory requirements, and in one embodiment takes on integer values in the intervals 824 to 849 and 1850 to 1910. The constant $(n_{amax})$ is the maximum size of a list used to track frequencies at which previous sweeps identified mobile device activity, and in one embodiment is initialized with a value of 4. The variable $(n_a)$ represents the current size of the list of active frequencies, and is initialized to a value of zero. The variable $(n_a)$ is limited to $(n_{amax})$ during operation. The index $(i_a)$ indicates which of the $(n_a)$ active frequencies is chosen for testing. The list of active frequencies $f_a[i_a]$ contains the values of the active frequencies at which mobile device activity was found in previous sweeps. The constant $(n_r)$ is the number of times active frequencies are redundantly checked during each sweep, and in one embodiment is initialized to a value of 2. The index (r) is used to determine whether a frequency is chosen from $f_t[i_t]$ or $f_a[i_a]$. At 305, a frequency (f) selection process is undertaken. At 307, it is determined whether or not the end of the frequency sweep has been accomplished (test frequency index $(i_t)$=the number of test frequencies in the sweep $(n_t)$). If so, at 309, an update status process is run. If the end of sweep process has not been accomplished, at 311, a synthesizer is loaded. At 313, it is determined whether or not the loaded synthesizer is stabilized. If stabilization has not occurred the chart 300 loops back to the initialization step at 303. If stabilization has occurred, at 315, a measure process is undertaken. After either the update status process at 309 or the measure process at 315, the chart 300 loops back to the frequency selection process at 305. The frequency (f) selection process, update status process and measure process are fully described below and in the corresponding figures.

Figure 4B:
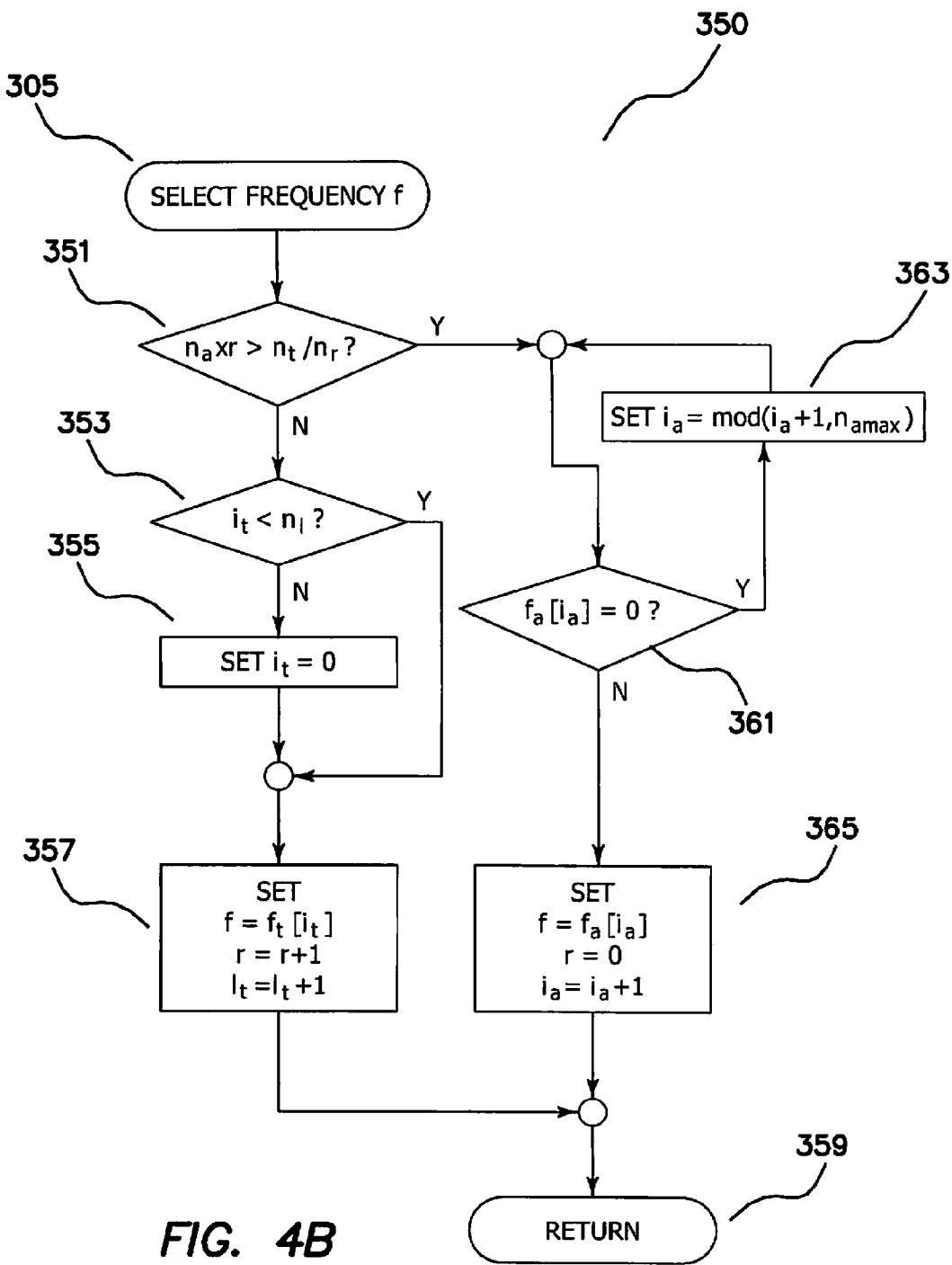

Flow chart 350, shown in FIG. 4b, details the frequency (f) selection process at 305 of flow chart 300. At 351, it is determined whether or not the number of active frequencies $(n_a)$ multiplied by a re-test index (r) is greater than number of test frequencies in the sweep $(n_t)$ divided by the number of active frequency re-tests per sweep $(n_r)$. If such condition is not met, at 353, it is determined whether or not the test frequency index $(i_t)$ is less than the number of test frequencies in the sweep $(n_t)$. If not, at 355, the test frequency index $(i_t)$ is set to zero. If so, the chart 350 bypasses step 355 thereby leaving the test frequency index $(i_t)$ at its current value. At 357, frequency (f) is set to a test frequency $f_t$ wherein the initial test frequency is identified as array member $f_t[0]$; re-test index (r) is incremented by 1; and the test frequency index $(i_t)$ is incremented by 1. After the values are set at 357, the chart 350 advances to the return at 359 signifying a return to chart 300. If, at 351, active frequencies $(n_a)$ multiplied by a re-test index (r) is a number greater than the number of test frequencies in the sweep $(n_t)$ divided by the number of active frequency re-tests per sweep $(n_r)$, the chart advances to 361 where it is determined whether or not the active frequency $(f_a)$ equals zero meaning the detected signal is not strong enough to be considered a relevant mobile device signal. If so, at 363, the active frequency index $(i_a)$ is set to modulus (active frequency index $(i_a)$ plus one and the maximum number of active frequencies $(n_a)$). If at 361 it is confirmed that active frequency $(f_a)[i_a]$ does not equal zero, meaning a signal strength is meaningful, the chart 350 advances to 365 where the frequency (f) is set to the active frequency $(f_a)[i_a]$; the re-test index is set to zero; and the active frequency index $(i_a)$ is incremented by one. After the values are set at 365, the chart 350 advances to the return at 359 signifying a return to chart 300. The left branch 352 of flow chart 350 goes through each of the frequencies in the test sweep while the right branch 354 goes through re-tests of signals detected during the initial sweep (assuming at least one active frequency).

$f_a[i_a]$ discussed above is a decision box to determine if the frequency entry is in the active frequencies list at index $[i_a]$ is set to zero. The notation indicates that $f_a$ is a list of values and $[i_a]$ is the index used to designate a specific element from the list. Upon initialization in flow chart 300, index $[i_a]$ is set to zero along with the active frequencies $f_a$. The "add f to frequency list" functions have the role of adding non-zero values to the list and updating $n_a$, ensuring that the program branches if the active frequencies list has at least one non-zero value. Table 1 shows how the modulus function works when the maximum number of active frequencies $(n_{amax})$ is set to 4.

TABLE 1

| [$i_a$] entering step | $i_a + 1$ | mod($i_a + 1$, 4) | [$i_a$] exiting step |
|---|---|---|---|
| 0 | 1 | 1 | 1 |
| 1 | 2 | 2 | 2 |
| 2 | 3 | 3 | 3 |
| 3 | 4 | 0 | 0 |
| 4 | 5 | 1 | 1 |
| 5 | 6 | 2 | 2 |
| 6 | 7 | 3 | 3 |
| 7 | 8 | 0 | 0 |
| ... | ... | ... | ... |

Figure 4C:
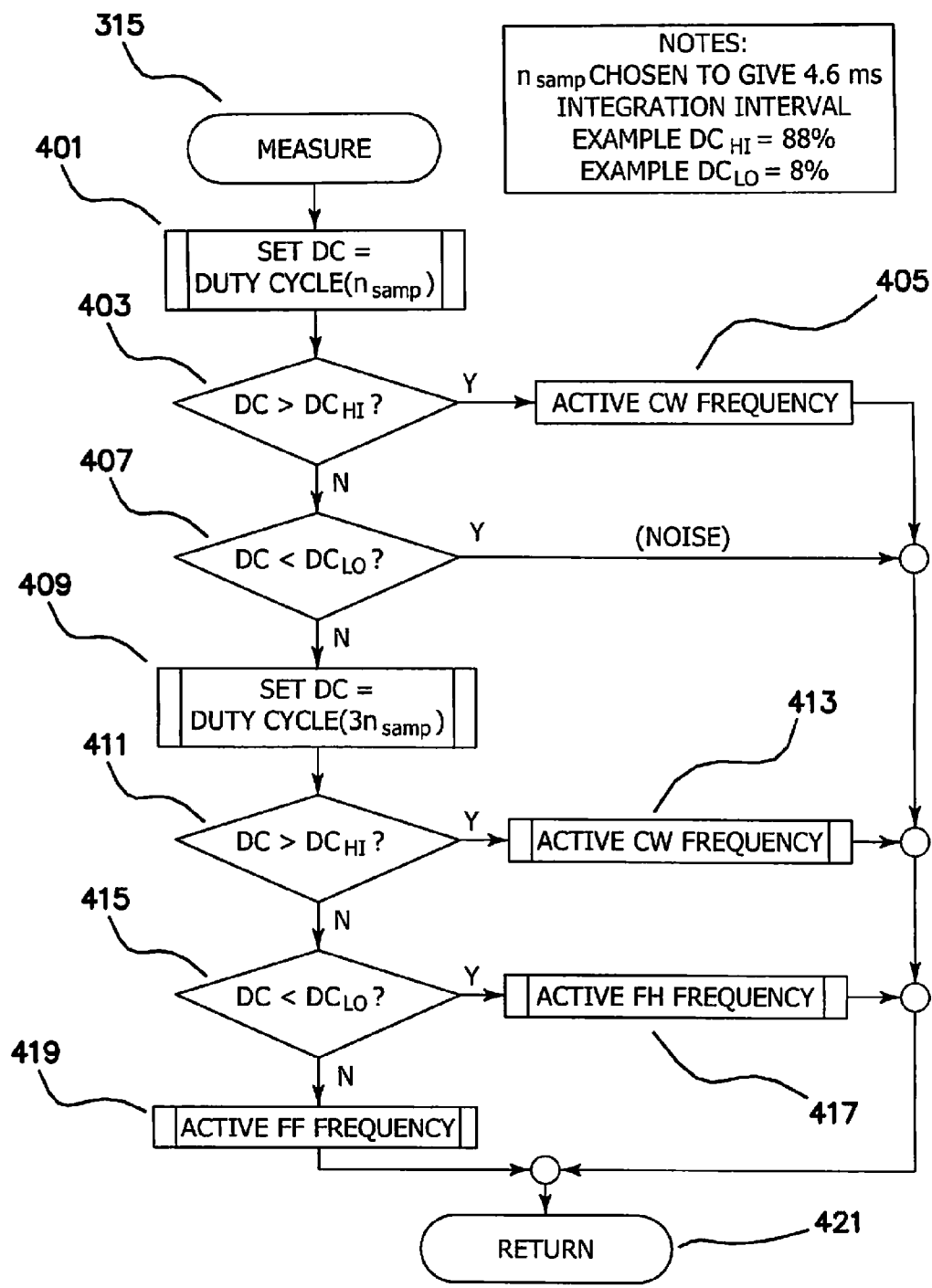

Flow chart 400, shown in FIG. 4c, details the measure process at 315 of flow chart 300. At 401, the duty cycle is determined over an interval of 4.6 milliseconds (DC($n_{samp}$)) which corresponds to a CDMA standard developed by Qualcomm. At 403, it is determined whether or not the duty cycle (DC) is greater than a high duty cycle value of 88% ($DC_{HI}$). If so, at 405, the system recognizes an active continuous wave frequency associated with the CDMA-based digital cellular standard. If, at 403, it is determined that the duty cycle (DC) is not greater than $DC_{HI}$, at 407, it is determined whether or not the duty cycle (DC) is less than a low duty cycle value of 8% ($DC_{LO}$). If so, the system categorizes the detected signal as noise. If not, at 409, the duty cycle (DC) measurement interval is set to three times (DC($3n_{samp}$)) or 13.8 milliseconds which corresponds with a GSM standard. At 411, it is determined whether or not the duty cycle (DC) is greater than a high duty cycle value of 88% ($DC_{HI}$). If so, at 413, the system recognizes an active continuous wave frequency associated with the CDMA-based digital cellular standard. If, at 411, it is determined that the duty cycle (DC) is not greater than $DC_{HI}$, at 415, it is determined whether or not the duty cycle (DC) is less than a low duty cycle value of 8% ($DC_{LO}$). If so, at 417, the system recognizes an active frequency hopping frequency associated with the GSM standard. If not, at 419, the system recognizes an active fixed frequency associated with the GSM standard. The chart 400 then advances to return 421 signifying a return to chart 300.

Figure 4D:
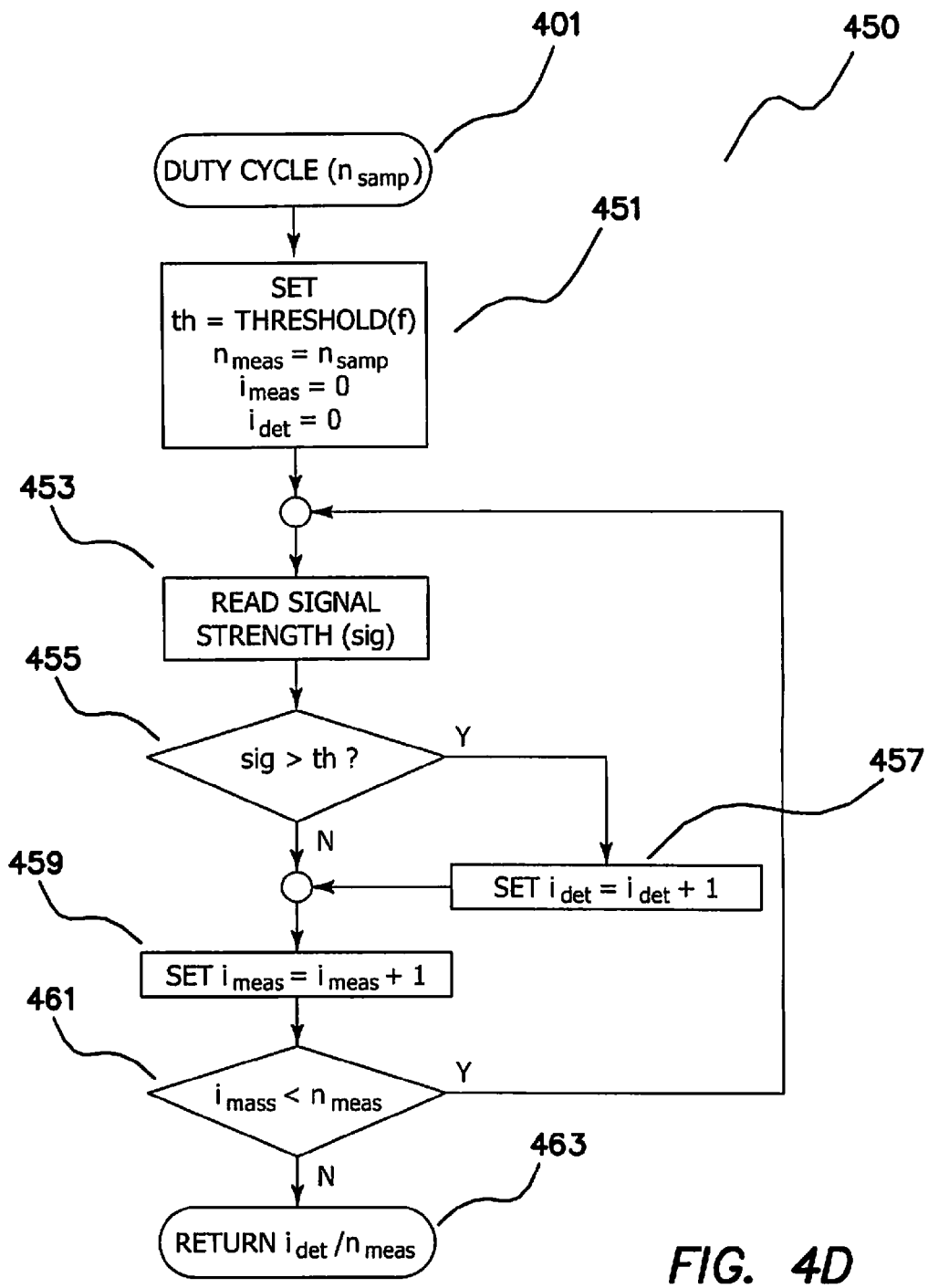

Flow chart 450, shown in FIG. 4d, details the process of setting the duty cycle (DC) at 401 and 409 of chart 400. At 451, the threshold frequency (f) is set (each frequency may have a different threshold); the number of measurements ($n_{meas}$) is set to the number of samples ($n_{samp}$); measure index ($i_{meas}$) is set to zero; and the detection index ($i_{det}$) is set to zero. Once the process gets to 409 the signal is classified as a cell signal, meaning that the noise classification is no longer an option. To reduce the probability of a false positive, the signal is checked more than once before deciding to alert the outside world to phone activity.

Radio signals emanating from a cell phone inside a vehicle can vary by a large factor (e.g., a factor of 1000). Use of a linear amplifier and digital-to-analog converter to perform detection is challenging and expensive. Accordingly, in one embodiment of the present invention, logarithmic amplifiers are used to produce an analog output proportional to the logarithm of the amplitude of the signal, thereby permitting the use of more affordable analog-to-digital converters. For example, a 1 volt peak-to-peak analog signal may produce an output from a logarithmic amplifier of −0.1 volt; a 0.1 volt peak-to-peak analog signal may produce an output of −0.2 volt; a 0.01 volt signal may produce an output of −0.3 volt; and a 0.001 volt signal may produce an output of −0.4 volt. Such a device produces a 0.1 volt change for every order of magnitude change on the input. At 453, a signal strength (sig) is read whereby a voltage is produced based on the signal strength detected. For example, for a frequency (f) in the 824-849 MHz band, threshold (f) returns a value of 10870, corresponding to a signal strength of 500 mV, and for a frequency (f) in the 1850-1910 MHz band, threshold (f) returns a value of 9000, corresponding to a signal strength of 414 mV. At 455, the signal strength (sig) is compared to the threshold frequency (f) to determine whether or not the signal strength (sig) is greater than the threshold frequency (f). If so, at 457, the detection index ($i_{det}$) is incremented by one and, at 459, the measure index ($i_{meas}$) is incremented by one. If at, 457, the signal strength (sig) is not greater than the threshold frequency (f) only the measure index ($i_{meas}$) is incremented by one at 459. At 461, it is determined whether or not the measure index ($i_{meas}$) is less than the total number of measurements ($n_{meas}$). If so, the chart 450 loops back to 455. If not, the chart 450 advances to return at 463 signifying a return to chart 400.

Figure 4E:
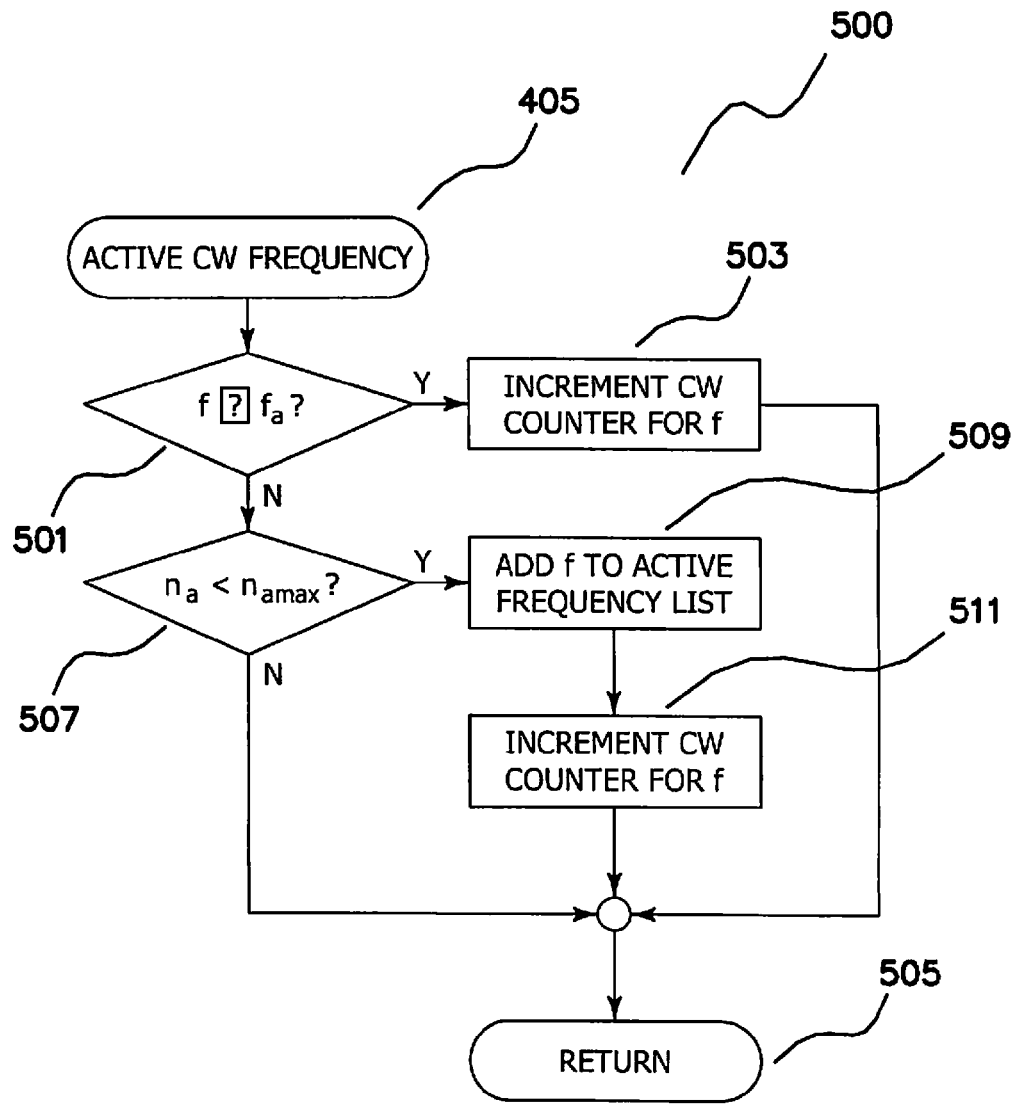

Flow chart 500, shown in FIG. 4e, details a process responsive to the detection of a continuous wave frequency signal at 405 or 413. At 501, it is determined whether or not the frequency (f) is a member of the active frequencies ($f_a$). If so, at 503, the continuous wave counter is incremented for frequency (f) after which the chart 500 advances to return at 505 signifying a return to chart 400. If, at 501, it is determined that the frequency (f) is not a member of the active frequencies ($f_a$), the chart advances to 507 where it is determined whether or not the number of active frequencies ($n_a$) is less than the maximum number of active frequencies ($n_{amax}$). If not, the chart 500 advances to return at 505 signifying a return to chart 400. If so, at 509, the frequency (f) is added to the active frequency list. Then at 511, the continuous wave counter is incremented for frequency (f). The continuous wave counter is incremented by an increment constant set up at the time of initialization 303 and may be different from one, to enable control over the rate of convergence of the algorithm.

Figure 4F:
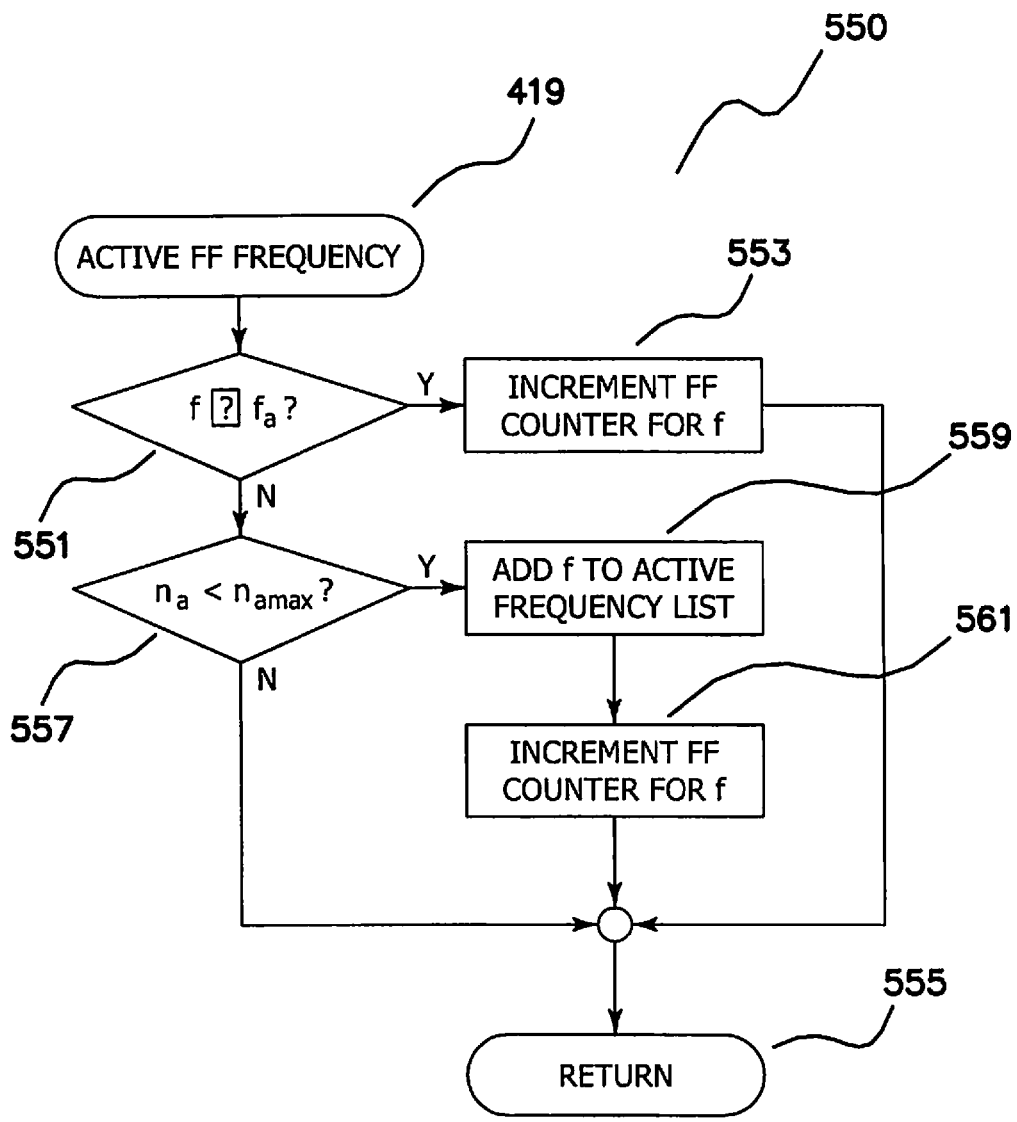

Flow chart 550, shown in FIG. 4f, details a process responsive to the detection of a fixed frequency signal at 419. At 551, it is determined whether or not the frequency (f) is a member of the active frequencies ($f_a$). If so, at 553, the fixed frequency counter is incremented for frequency (f) after which the chart 550 advances to return at 555 signifying a return to chart 400. If, at 551, it is determined that the frequency (f) is not a member of the active frequencies ($f_a$), the chart advances to 557 where it is determined whether or not the number of active frequencies ($n_a$) is less than the maximum number of active frequencies ($n_{amax}$). If not, the chart 550 advances to return at 555 signifying a return to chart 400. If so, at 559, the frequency (f) is added to the active frequency list. Then, at 561, the fixed frequency counter is incremented for frequency (f). The fixed frequency counter is incremented by an increment constant set up at the time of initialization 303 and may be different from one, to enable control over the rate of convergence of the algorithm.

Figure 4G:
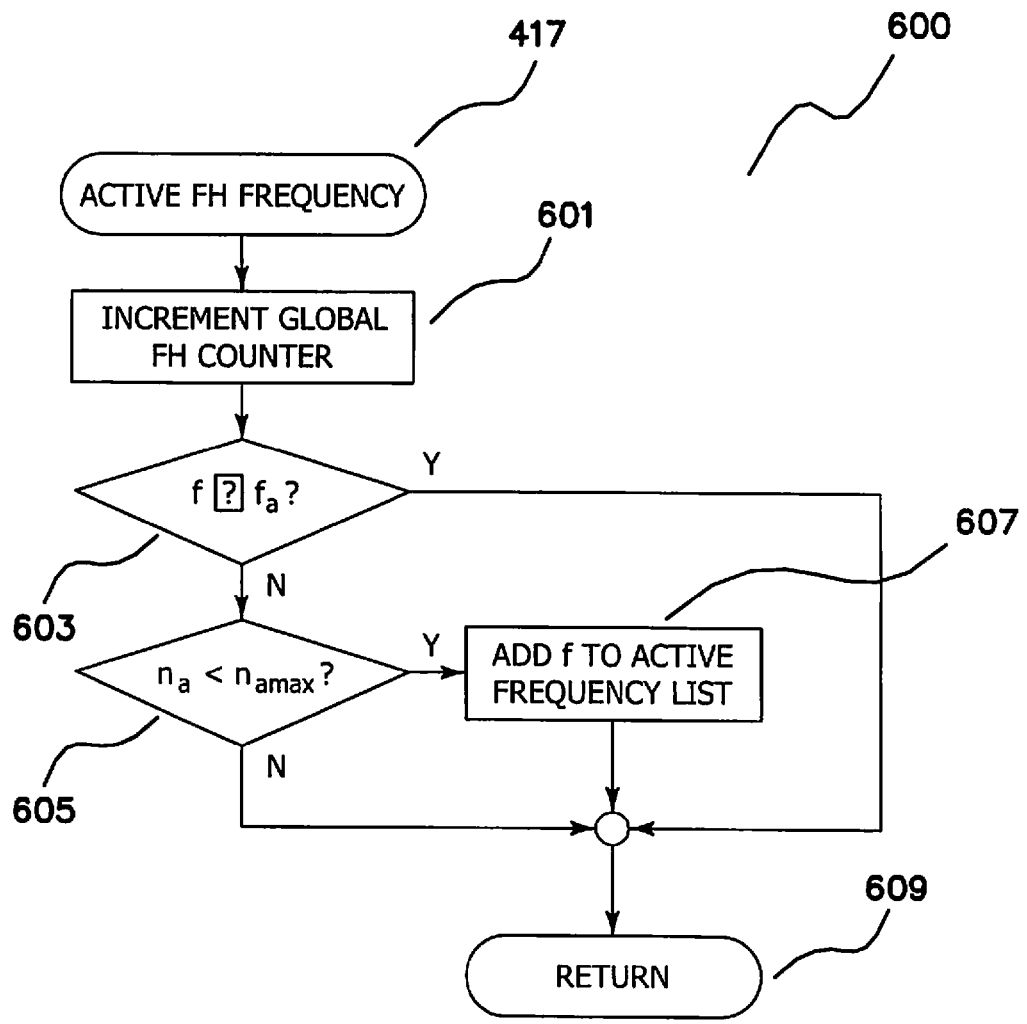

Flow chart 600, shown in FIG. 4g, details a process responsive to the detection of a frequency hopping signal at 417. At 601, frequency hopping counter is incremented. At 603, it is determined whether or not the frequency (f) is a member of the active frequencies ($f_a$). If not, the chart 600 advances to 605 where it is determined whether or not the number of active frequencies ($n_a$) is less than the maximum number of active frequencies ($n_{amax}$). If so, at 607, the frequency (f) is added to the active frequency list. If, at 603, the frequency (f) is a member of the active frequencies ($f_a$), the chart advances to return at 609 signifying a return to chart 400.

Figure 4H:
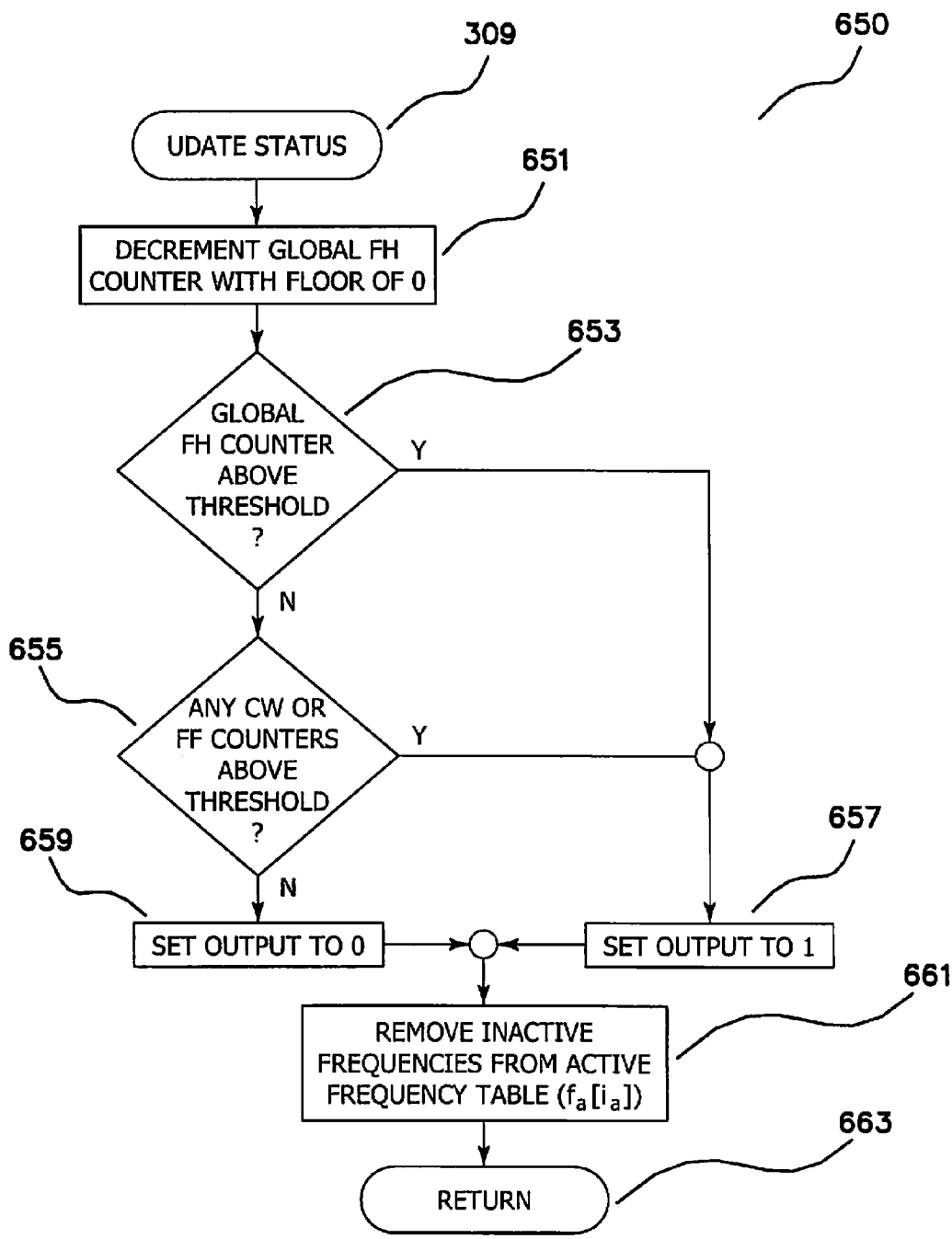

Flow chart 650, shown in FIG. 4h, details the update status process 309 from chart 300. At 651, the frequency hopping counter is decremented to a floor value of zero. At 653, it is determined whether or not the frequency hopping counter is above the threshold value. At 655, it is determined whether or not any of the continuous wave or fixed frequency counters are above the threshold values. If the condition has been met at 653 or 655, at 657 the output is set to one signifying a detected signal. If not, at 659 the output is set to zero signifying no detected signals. At 661, after the counters are set, inactive frequencies are removed from the frequency table ($f_a[i]$). Thereafter, the chart 650 advances to return at 663 signifying a return to chart 300. The frequency hopping counter is incremented by an increment constant set up at the time of initialization 303 and may be different from one, to enable control over the rate of convergence of the algorithm.

Figure 5:
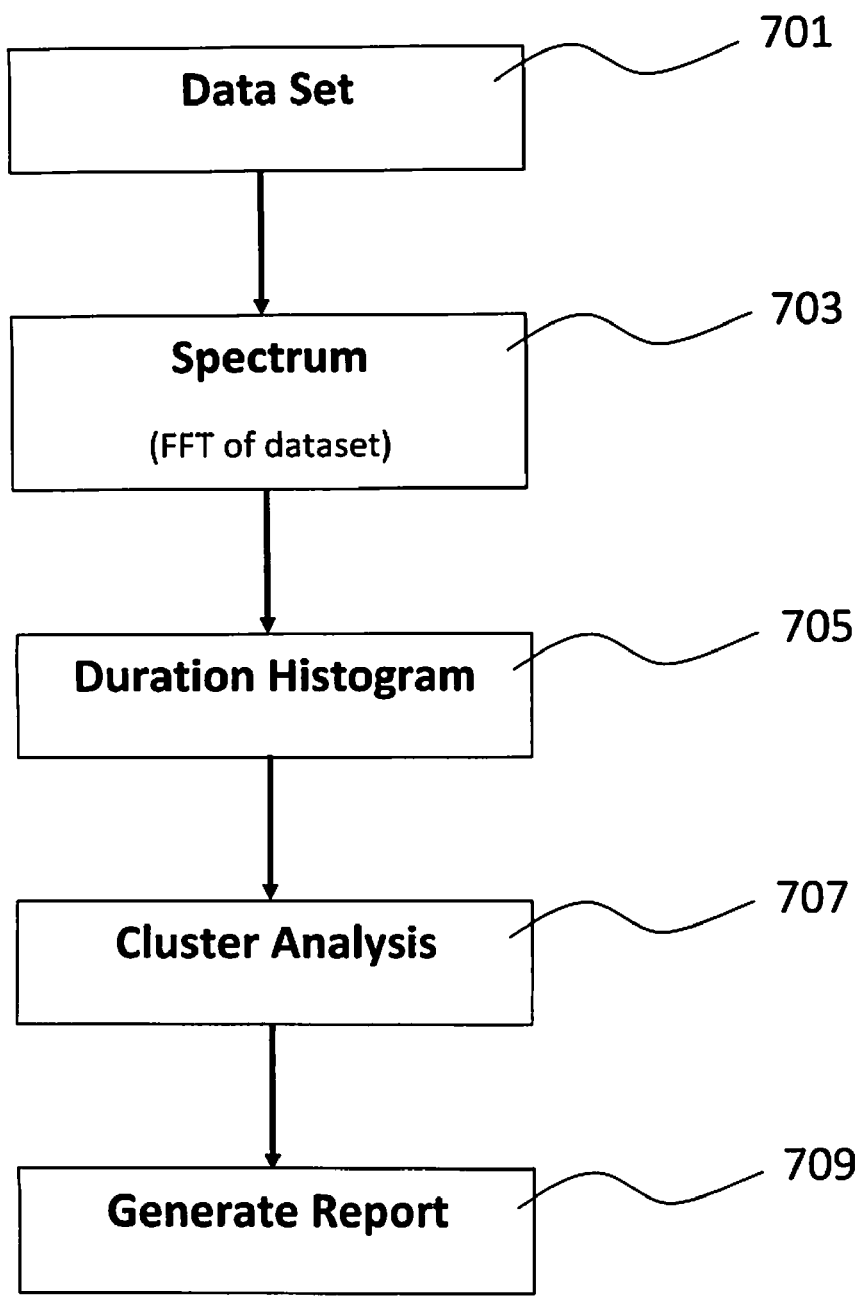
FIG. 5 illustrates a flow chart detailing a post signal acquisition methodology according to the embodiments of the present invention.

In one embodiment, the only information transmitted from the vehicle to the database is a time stamp and signal detection status. A data transmission device periodically transmits information back to a remote database. A flow chart 700, shown in FIG. 5, begins with a dataset extracted from the remote database. At 703, the initial data processing step involves a frequency analysis of the data using, for example, a Fourier transform of the data. In one embodiment, the initial data processing step utilizes a fast Fourier transform of an equally time spaced set of values which represent the signal detection status at that moment. The dataset consists of time stamped detection transition information that includes the periodic transmissions of the data transmission device. The time interval between successive transitions represents the duration of signal detection. This reduction of the data to a series of time stamped durations is hereinafter referred to as the duration dataset. The duration dataset is then sampled at a high frequency relative to the events of interest. In one embodiment, the data transmission device transmits at an interval of 60 seconds and the sampling rate used to convert the original dataset into a periodic pulse train for the fast Fourier transform is once per second. This sampling rate adequately covers the shortest duration events which are text messages which last about 3 seconds. It is expected that the periodic signal from the monitoring device will be the dominant peak in spectrum of the dataset. Thus, knowing the period and phase of the data transmission device signal allows for the removal of the data transmission device signal from the duration dataset either by removing the data transmission device signature from the spectrum and inverting it or directly subtracting the data transmission device signal from the duration dataset which hereinafter is referred to as the cell duration dataset. In addition, the presence or absence of the data transmission device signal can be used to identify tampering or other issues requiring service. At 705, a duration histogram is created from the cell duration dataset, where a bin width is chosen by either a Sturges or Scott estimator. Phone calls are evident from significant bumps in a right tail of the histogram. Text messaging is less obvious because a text message duration is similar to the data transmission device transmission time. Consequently, the removal of the data transmission device signal results in structure in the left portion of the histogram implying text messaging. Generating a histogram exposes the existence of calling and texting events. However, there can be loss of temporal association. At 707, this problem is addressed by looking for clusters of events in time. This is particularly important for confirming frequency hopping signals where even though a call is continuous the transmission of information is not. Also, the confidence in declaring texting increases dramatically when short events are clustered within 60 seconds of one another. Based upon analysis, the duration histogram and the cluster analysis results in a report generated at 709.

In order to increase the effectiveness of the system, the settings and thresholds of the system as described above may be varied to address environmental conditions including optimum measurement distance, mobile device signal output strength, threshold detection settings, vehicle cab volume and shape. To optimize the system's detection thresholds with the module and any antennas installed in the subject vehicle, a programming interface is provided, enabling adjustments. Microcontrollers, such as the one used in the device, come with a programming interface and the manufacturer of the microcontroller provide software and hardware to permit in-situ reprogramming. Such optimization takes into account the effects of cellular telephone position and orientation in the hand of the driver, vehicle location relative to cellular towers, effects of vehicle movement on signal strength, tower-to-tower hand offs, traffic density, and multiple types of phones and services. This may be accomplished empirically during a road test. In a further embodiment, tower-to-tower hand off events and cell phone power-on events can be used to dynamically optimize detection thresholds.

Alternatively, spectrum measurements using test instrumentation such as a spectrum analyzer can be used to document signal strengths and thresholds to seek optimization across a fleet using the data obtained.

The collected mobile device usage data and vehicle data (e.g., GPS, telemetry, etc.) are synchronized over the same time frame providing the operator with a correspondence between vehicle operation and mobile device usage by a vehicle driver. The data may then be evaluated to educate, train and reprimand drivers of the vehicles. The information may also be used as evidence of safe driving to insurance companies to support lower insurance rates.

Figure 6:
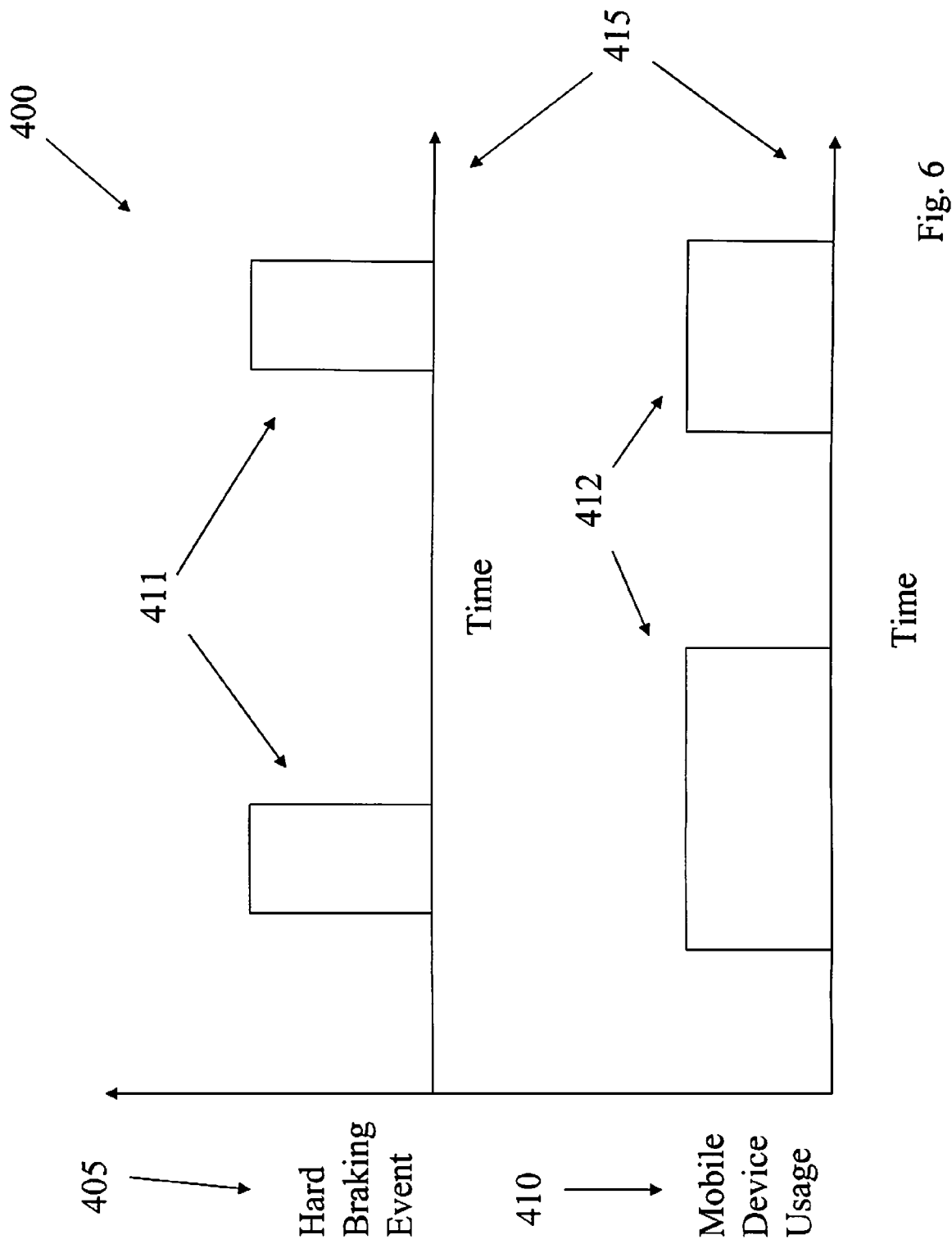
FIG. 6 illustrates a graph of mobile device usage and hard braking events against time.

In one embodiment of the present invention, the system includes a hard braking measurement device in communication with the mobile device usage system described herein. The hard braking measurement device may be an accelerometer or other measurement device that is used to detect sudden decreases in speed is linked to the telemetry equipment 115. The system is then able to record hard braking events synchronized with the mobile device usage data to evaluate the correspondence between hard braking events and mobile device usage by a driver of a vehicle. FIG. 6 shows a graph 400 detailing mobile device usage 405 and hard braking events 410 against time 415. From the graph 400 it is evident that both hard braking events 411 correspond to times when the driver was using a mobile device 412 (i.e., talking or texting). This information like that discussed above can be used to educate, train and/or reprimand drivers.

In another embodiment, the system and method are used to evaluate rental car fleets. In this embodiment, the mobile device usage and telemetry data may be downloaded wirelessly or via a data cable upon return of the vehicle to establish a record of driving quality during identified mobile device usage by a driver.

While the detailed description focuses on phone call and text messages, the system is adaptable to any type of data transmission as well. Moreover, the mobile device signal detection system may be used without the telemetry system. That is, detecting and analyzing mobile device signals corresponding to a driver of a vehicle is a valuable and unique exercise whether or not the vehicle operation data is also acquired.

It is envisioned that the embodiments of the present invention may be installed in vehicles as an aftermarket product or installed in vehicles at the time of manufacture. Any type of vehicle may benefit from the embodiments of the present invention.

Although the invention has been described in detail with reference to several embodiments, additional variations and modifications exist within the scope and spirit of the invention as described and defined in the following claims.

We claim:

1. A mobile device usage detection system for use with vehicles comprising:
    a signal detection unit configured to detect mobile device signals at frequencies corresponding to usage of mobile devices, said signal detection unit comprising one or more antennas positioned to detect mobile device signals attributable to a mobile device, remote from said one or more antennas, being used by a driver of a vehicle;
    a time recording unit for associating a time with each detected mobile device signal;
    a signal analyzing unit configured to analyze signal data acquired by said signal detection unit to determine whether or not signals detected by said signal detection unit correspond to mobile device usage of a driver of a vehicle such that signals which do not correspond to mobile device usage of a driver of vehicle are disregarded; and
    a synchronization module to synchronize signals corresponding to mobile device usage of a driver with vehicle operation.

2. The mobile device usage detection system of claim 1 wherein said one or more antennas are positioned rearward and above a driver seat.

3. The mobile device usage detection system of claim 1 further comprising a memory unit configured to store signal data acquired by said signal detection unit.

4. The mobile device usage detection system of claim 1 wherein said one or more antennas comprise patch/microstrip antennas.

5. The mobile device usage detection system of claim 1 further comprising a vehicle data collection system configured to acquire vehicle data; and software means to correlate results of said signal analyzing unit with vehicle data results of said vehicle data collection system.

6. The mobile device usage detection system of claim 1 further comprising means for determining hard braking events associated with the vehicle.

7. The mobile device usage detection system of claim 5 further comprising a remote data receiving system in communication with the vehicle data collection system.

8. The mobile device usage detection system of claim 5 wherein said vehicle data collection system is a telemetry or GPS system.

9. The mobile device usage detection system of claim 1 further comprising a power regulator.

10. The mobile device usage detection system of claim 1 further comprising a programming interface allowing system environmental adjustments in-situ.

11. A mobile device usage detection system for use with vehicles comprising:
    a signal detection unit configured to detect mobile device signals at frequencies corresponding to usage of mobile devices, said signal detection unit comprising one or more antennas positioned within subject vehicles to detect mobile device signals attributable to mobile device usage by drivers of vehicles, said mobile devices remote from said one or more antennas;
    a memory unit in communication with said signal detection unit to store signal data acquired by said signal detection unit;
    a time recording unit for associating a time with each detected mobile device signal;
    a signal analyzing unit configured to analyze signal data acquired by said signal detection unit to determine whether or not signals detected by said signal detection unit correspond to mobile device usage of a driver of a vehicle such that signals which do not correspond to mobile device usage of a driver of vehicle are disregarded, said signal analyzing unit further configured to receive the signal data from said memory unit; and
    a synchronization module to synchronize signals corresponding to mobile device usage of a driver with vehicle operation.

12. The mobile device usage detection system of claim 11 further comprising a vehicle data collection system configured to acquire vehicle data; and software means to correlate results of said signal analyzing unit with vehicle data results of said telemetry unit.

13. The mobile device usage detection system of claim 11 further comprising means for determining hard braking events associated with the vehicle.

14. The mobile device usage detection system of claim 12 further comprising a remote data receiving system in communication with the vehicle collection system.

15. The mobile device usage detection system of claim 14 wherein said vehicle data collection system is a telemetry or GPS system.

16. The mobile device usage detection system of claim 11 further comprising a power regulator.

17. The mobile device usage detection system of claim 11 further comprising a programming interface allowing system environmental adjustments in-situ.

18. A method of detecting mobile device usage within a driver area of a vehicle comprising:
    detecting with one or more antennas within said vehicle remote mobile device signals at frequencies corresponding to usage of mobile devices within a vehicle;
    associating a time with detected mobile device signals;
    analyzing said detected mobile device signals to determine whether or not detected mobile device signals correspond to mobile device usage of a driver of a vehicle and disregarding signals which do not correspond to mobile device usage of a driver of vehicle; and
    synchronizing signals corresponding to mobile device usage of a driver with vehicle operation.

19. The method of claim 18 further comprising conducting a signal sweep of pre-established programmed mobile device frequencies.

20. The method of claim 18 further comprising detecting vehicle operation data.

21. The method of claim 18 further comprising correlating vehicle operation data with signal data corresponding to mobile device usage by a driver of a vehicle.

22. The method of claim 18 further comprising recording a time associated with hard braking events and a magnitude of the hard braking event.

23. The method of claim 18 further comprising allowing system environmental adjustments in-situ.

24. A method of detecting mobile device usage within a driver area of a vehicle comprising:
    pre-programming a processor with a list of known mobile device signal frequencies;
    positioning one or more antennas within said vehicle to detect signals corresponding to remote mobile device usage in a driver area of the vehicle;
    sweeping an interior of the vehicle for signals corresponding to mobile device usage;
    analyzing detected mobile device signals to determine whether or not detected mobile device signals correspond to mobile device usage of a driver of a vehicle and disregarding signals which do not correspond to mobile device usage of a driver of vehicle;

upon confirming a signal detected during the sweep which matches a frequency on said list of known mobile device frequencies and a signal strength profile, recording the time during which said signal is active; and synchronizing signals corresponding to mobile device usage of a driver with vehicle operation.

25. The method of claim 24 further comprising detecting vehicle operation data.

26. The method of claim 25 further comprising evaluating vehicle operation data at a time corresponding to the active signal.

* * * * *